(12) United States Patent
Yamazaki et al.

(10) Patent No.: US 10,401,157 B2
(45) Date of Patent: Sep. 3, 2019

(54) OPTICAL INNER SURFACE MEASUREMENT DEVICE

(71) Applicant: ADAMANT NAMIKI PRECISION JEWEL CO., LTD., Tokyo (JP)

(72) Inventors: Hiroshi Yamazaki, Kuroishi (JP); Takuya Tateyama, Kuroishi (JP); Kenji Narita, Kuroishi (JP); Takafumi Asada, Kuroishi (JP)

(73) Assignee: Adamant Namiki Precision Jewel Co., Ltd., Tokyo (JP)

( * ) Notice: Subject to any disclaimer, the term of this patent is extended or adjusted under 35 U.S.C. 154(b) by 0 days.

(21) Appl. No.: 16/240,920

(22) Filed: Jan. 7, 2019

(65) Prior Publication Data

US 2019/0137263 A1    May 9, 2019

Related U.S. Application Data

(63) Continuation of application No. PCT/JP2016/071012, filed on Jul. 15, 2016.

(51) Int. Cl.
  *G01B 11/24*    (2006.01)
  *G01B 11/255*    (2006.01)
  (Continued)

(52) U.S. Cl.
  CPC .......... *G01B 11/2408* (2013.01); *G01B 11/12* (2013.01); *G01B 11/255* (2013.01); *G01H 9/004* (2013.01)

(58) Field of Classification Search
  CPC ..... G01B 11/24; G01B 11/2408; G01B 11/12; G01B 11/255; G01H 9/004
  See application file for complete search history.

(56) References Cited

U.S. PATENT DOCUMENTS 4,791,293 A * 12/1988 Barriere ................ F22B 37/003
  250/302
8,055,107 B2 * 11/2011 Masuda ............... A61B 5/0066
  385/26
(Continued)

FOREIGN PATENT DOCUMENTS

JP    H0455504 U    5/1992
JP    5060678 B2    10/2012
(Continued)

OTHER PUBLICATIONS

International Search Report issued in PCT/JP2016/071012; dated Oct. 4, 2016.

*Primary Examiner* — Sang H Nguyen
(74) *Attorney, Agent, or Firm* — Studebaker & Brackett PC

(57) ABSTRACT

An optical inner surface measurement device is provided; which includes a motor; a rotary optical fiber configured to be rotated by the motor; a fixed optical fiber configured not to rotate relative to the rotary optical fiber; and a runout detection sensor configured to measure a runout amount of the rotary optical fiber, wherein an optical path conversion device is arranged at a tip end of the rotary optical fiber, at a back of the motor, both end surfaces of the rotary optical fiber and the fixed optical fiber face each other with a minute clearance, and reflected light, which is captured by the optical path conversion device, from a measurement target object inner surface is guided to a measurement machine body by way of the rotary optical fiber and the fixed optical fiber and is analyzed by a computer to produce inner surface measurement data, and the inner surface measurement data is corrected based on the runout amount detected by the runout detection sensor.

2 Claims, 9 Drawing Sheets

(51) Int. Cl.
*G01H 9/00* (2006.01)
*G01B 11/12* (2006.01)

(56) References Cited

U.S. PATENT DOCUMENTS

| | | | | |
|---|---|---|---|---|
| 2009/0043191 A1* | 2/2009 | Castella | ............... | A61B 5/0066 |
| | | | | 600/425 |
| 2009/0086213 A1* | 4/2009 | Masuda | ............... | A61B 5/0066 |
| | | | | 356/479 |
| 2009/0244545 A1* | 10/2009 | Toida | ................... | A61B 5/0066 |
| | | | | 356/477 |
| 2009/0264768 A1* | 10/2009 | Courtney | ............. | A61B 5/0062 |
| | | | | 600/463 |
| 2011/0164255 A1* | 7/2011 | Konno | ................. | A61B 5/0062 |
| | | | | 356/479 |
| 2014/0275986 A1* | 9/2014 | Vertikov | ................ | A61B 5/061 |
| | | | | 600/424 |
| 2016/0153765 A1* | 6/2016 | Yamazaki | ............ | A61B 5/0066 |
| | | | | 356/479 |
| 2017/0248411 A1* | 8/2017 | Yamazaki | ............. | G01B 11/12 |

FOREIGN PATENT DOCUMENTS

| | | |
|---|---|---|
| JP | 2015008995 A | 1/2015 |
| WO | 2016084638 A1 | 6/2016 |

\* cited by examiner

| Z-POSITION [mm] | CORRECTION OFFSET AMOUNT Lc ||
| | RUNOUT AMOUNT CORRECTION | OFF-CENTER XY POSITION |
|---|---|---|
| 0.00 | 0.12 | 0.15/0.35 |
| 0.05 | 0.14 | 0.13/0.37 |
| 0.10 | 0.16 | 0.11/0.39 |
| | | |
| | | |
| | | |
| | | |
| | | |
| | | |
| | | |
| 9.90 | 0.04 | 0.06/0.83 |
| 9.95 | 0.06 | 0.04/0.85 |

OPTICAL INNER SURFACE MEASUREMENT DEVICE

CROSS-REFERENCE TO RELATED APPLICATION

This application is a continuation application of International Application No. PCT/JP2016/071012, filed on Jul. 15, 2016, the entire contents of which are hereby incorporated by reference.

BACKGROUND

1. Technical Field

The present disclosure relates to an optical inner surface measurement device.

2. Related Art

An optical inner surface measurement device has been known, which is configured to take reflected light obtained in such a manner that a light beam is emitted from an optical measurement probe entering while rotating toward an inner surface of a measurement target object, thereby observing an internal shape or measuring dimension accuracy. For example, dimension accuracy and inner surface finishing accuracy of a thin-hole inner surface of a fuel injection nozzle used for an automobile engine or a thin-diameter nozzle hole of an inkjet component greatly influence product performance. For inspection of these types, a nozzle hole diameter measurement machine including a CCD camera and a linear scale combined each other is generally used. A method has been known, in which based on observation with the CCD camera from the outside of a hole, a distance from an edge of one end portion of the hole to an edge of the other end portion is measured using the sliding linear scale. Generally, only a diameter value is measured by this method. However, in recent years, an optical measurement technique for performing non-contact measurement of geometric accuracy of a measurement target object inner surface has been introduced. By application of such a measurement method, there is a probability that diameter accuracy and geometric accuracy of a thin-diameter inner surface of a nozzle are measured. For example, an image diagnosis technique (an optical imaging technique) for performing non-contact measurement and inspection of a measurement target object inner surface has been broadly utilized at a device machine or a medical site. These techniques have been applied at, e.g., a manufacturing site for precision equipment. According to this technique, a method in which reflected light obtained by irradiation of an inner surface with a light beam is captured and an inner surface shape is measured by computer analysis has been employed as the technique of inspection or image diagnosis of a deep-hole inner surface. A representative structure has been disclosed in, e.g., JP-UM-A-04-55504, Japanese Patent No. 5060678, and JP-A-2015-008995.

According to an inner diameter shape measurement sensor disclosed in JP-UM-A-04-55504, slit light emitted from a reflection mirror rotating in a hole of a measurement target object is utilized to measure an inner surface. However, due to axial runout of a rotation casing and a motor, defocusing and image distortion are provided to collected image data. For this reason, high-accuracy measurement cannot be performed.

Japanese Patent No. 5060678 discloses that high-accuracy measurement is performed in such a manner that a distance to a measurement target object with reference to an output-side end surface of a light beam is measured using an optical displacement meter. However, the shape and dimensions of an inner surface of the measurement target object cannot be measured.

According to the method for measuring a thin-hole inner surface by means of an optical imaging probe in JP-A-2015-008995, the probe is inserted toward an inner surface of a measurement target object. Then, an optical path of a light beam from a condensing lens rotates 360 degrees by rotation of a mirror as an optical path conversion device. In addition, due to a change in centrifugal force, the angle of the mirror changes. As a result, due to a change in an emission angle of the light beam, the light beam is emitted in a three-dimensional direction. In this manner, a three-dimensional shape is measured. However, the optical probe inserted into the measurement target object includes a built-in rotating motor. Thus, a diameter at a tip end portion needs to be equal to or greater than about 1.5 millimeters. For this reason, the shape and dimensions of an inner surface of a thin nozzle hole having a diameter of 0.1 millimeters cannot be measured.

SUMMARY

An optical inner surface measurement device according to the present disclosure includes a motor; a rotary optical fiber configured to be rotated by the motor; a fixed optical fiber configured not to rotate relative to the rotary optical fiber; and a runout detection sensor configured to measure a runout amount of the rotary optical fiber, wherein an optical path conversion device is arranged at a tip end of the rotary optical fiber, at a back of the motor, both end surfaces of the rotary optical fiber and the fixed optical fiber face each other with a minute clearance, and reflected light, which is captured by the optical path conversion device, from a measurement target object inner surface is guided to a measurement machine body by way of the rotary optical fiber and the fixed optical fiber and is analyzed by a computer to produce inner surface measurement data, and the inner surface measurement data is corrected based on the runout amount detected by the runout detection sensor.

DETAILED DESCRIPTION

Figure 1:
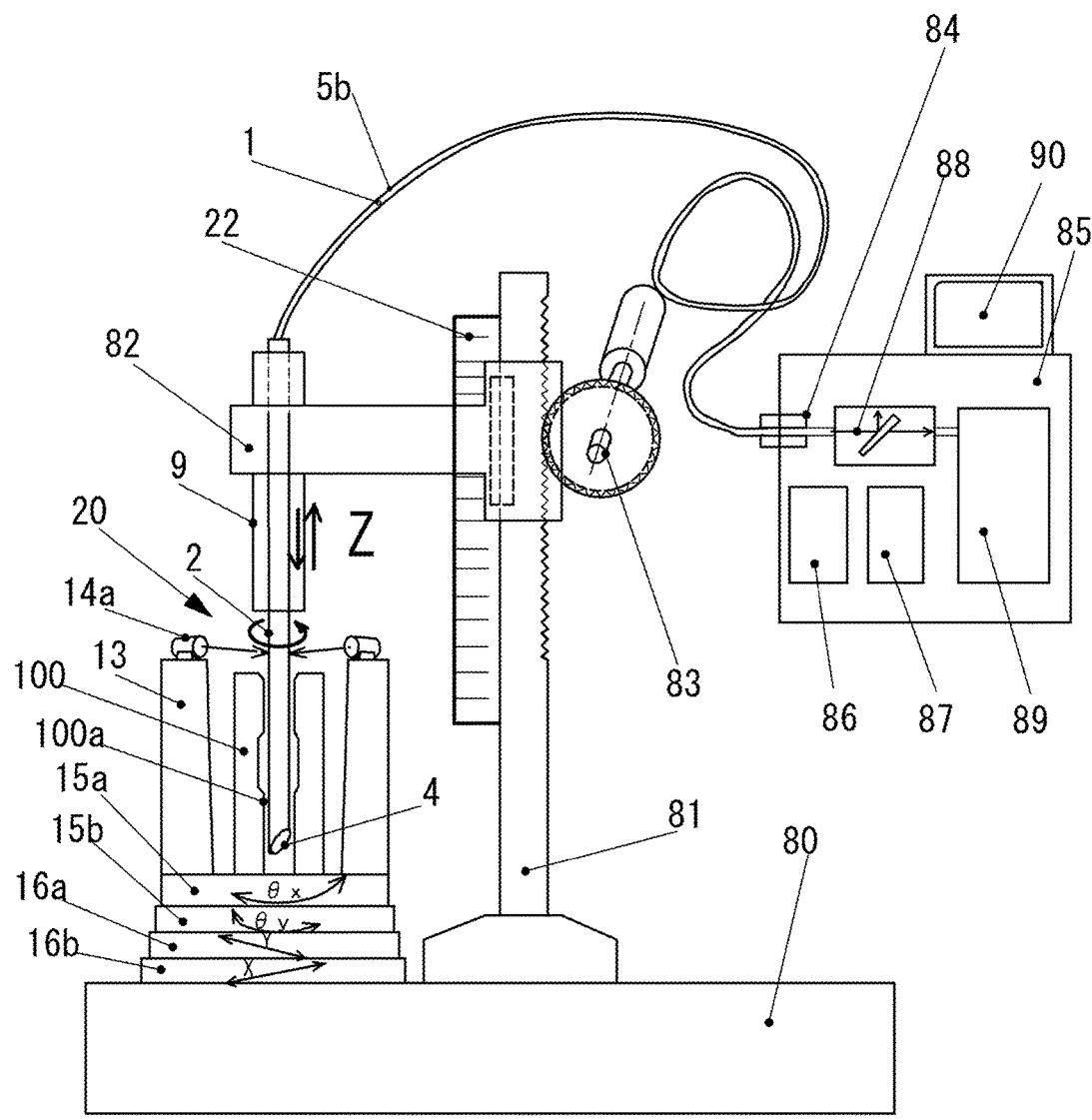
FIG. 1 is a view of a configuration of an optical inner surface measurement device according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An optical inner surface measurement device of the present disclosure has been made in view of the above-described typical situation. Objects of the present disclosure are to three-dimensionally collect a reflected light of a light beam rotatably emitted from a measurement probe or an optical fiber thinner than a thin nozzle hole as a measurement target object, the measurement probe or the optical fiber being inserted toward an inner surface of the thin nozzle hole and to perform computer processing for the collected reflected light to observe image data or measure dimension and geometric accuracy. It is also an object to eliminate influence of axial runout caused at the measurement probe itself rotatably emitting the light beam to the measurement inner surface to obtain measurement data with less variation. The present disclosure is intended to accomplish these objects to provide an optical inner surface measurement device configured to eliminate influence of fluctuation of an optical system and influence of motor axial runout to accurately and precisely measure an inner surface of a thin hole, whose measurement has been typically unavailable, having a diameter of 0.1 millimeter order.

In order to solve such a problem, an optical inner surface measurement device according to the present disclosure includes a motor, a rotary optical fiber configured to be rotated by the motor, a fixed optical fiber configured not to rotate relative to the rotary optical fiber, and a runout detection sensor configured to measure a runout amount of the rotary optical fiber. In the optical inner surface measurement device, an optical path conversion device is arranged at a tip end of the rotary optical fiber, at a back of the motor, both end surfaces of the rotary optical fiber and the fixed optical fiber face each other with a minute clearance, and reflected light, which is captured by the optical path conversion device, from a measurement target object inner surface is guided to a measurement machine body by way of the rotary optical fiber and the fixed optical fiber and is analyzed by a computer to produce inner surface measurement data, and the inner surface measurement data is corrected based on the runout amount detected by the runout detection sensor.

According to the optical inner surface measurement device of the present disclosure, influence of fluctuation of an optical system and influence of runout of the rotary optical fiber are eliminated, so that an inner surface of a thin hole, whose measurement has been typically unavailable, having a diameter of 0.1 millimeter order can be accurately and precisely measured.

The first characteristics of an optical inner surface measurement configured to observe and measure a measurement target object of the optical measuring technique according to the present embodiments is that the optical inner surface measurement device includes a motor, a rotary optical fiber configured to be rotated by the motor, a fixed optical fiber configured not to rotate relative to the rotary optical fiber, and a runout detection sensor configured to measure a runout amount of the rotary optical fiber. In the optical inner surface measurement device, it is further configured so that an optical path conversion device is arranged at a tip end of the rotary optical fiber, at a back of the motor, both end surfaces of the rotary optical fiber and the fixed optical fiber face each other with a minute clearance, and reflected light, which is captured by the optical path conversion device, from a measurement target object inner surface is guided to a measurement machine body by way of the rotary optical fiber and the fixed optical fiber and is analyzed by a computer to obtain inner surface measurement data, and the inner surface measurement data is corrected based on the runout amount detected by the runout detection sensor. With this configuration, e.g., an optical fiber including a tip end having a thin diameter of 0.1 millimeter order can be formed. Thus, the optical fiber is inserted into a thin nozzle hole, so that measurement can be accurately performed using a light beam emitted inside the hole with almost no influence of roughness of the measurement target object. Moreover, a thin-hole inner surface can be accurately and precisely measured without influence of motor axial runout.

The second characteristics is a configuration, in which a translucent flat plate made of a material having a refractive index different from that of the rotary optical fiber is integrally provided at at least part of the rotary optical fiber on a back side with respect to the optical path conversion device, and a length of a light beam from the translucent flat plate to a measurement target object surface is measured. Note that the "back side" of the rotary optical fiber with respect to the optical path conversion device means a measurement machine body side as a light source side with respect to a tip end side (a front side) of the optical probe. With this configuration, influence of fluctuation of an interference optical system of a measurement machine body can be eliminated. As a result, accurate and precise inner diameter measurement and inner surface geometric accuracy measurement can be made.

The third characteristics is a configuration, in which the optical path conversion device includes a prism made of a translucent material having a refractive index different from that of the rotary optical fiber, and a length of a light beam from the tip end of the rotary optical fiber to a measurement target object surface is measured. According to this configuration, the influence of fluctuation of the interference optical system of the measurement machine body can be eliminated. Thus, accurate and precise inner diameter measurement and inner surface geometric accuracy measurement can be made.

Next, preferred example embodiments will be described with reference to the drawings.

First Example

An optical inner surface measurement device according to the present embodiment will be described.

FIGS. 1 to 9 illustrate the optical inner surface measurement device according to the present embodiment.

FIG. 1 is a view of a configuration of the optical inner surface measurement device according to the present embodiment. A stand 81 is fixed to a measurement machine base 80. A slider 82 is, together with an optical probe 20, moved up and down by a slider motor 83. By a work angle adjustment machine 15 and a work XY slider 16, the attachment position and angle of an inspection target object 100 set on the measurement machine base 80 are adjusted. The optical probe 20 is configured to move in and out of a deep hole of the inspection target object 100. A rotary optical fiber 2 is configured to detect a runout amount during rotation by means of runout detection sensors 14a, 14b. Moreover, a linear scale 22 is configured to detect the position of the slider 82 or the optical probe 20 in an upper-to-lower direction (a Z-axis direction). A light beam emitted from a measurement machine body 85, such as near-infrared light or laser light, is discharged from an optical path convertor 4, and is reflected on a measurement target object inner surface 100a. Such reflected light is guided to the rotary optical fiber 2 to pass inside a motor case 9 and a tube 5b. Further, the reflected light enters an optical interference analysis device 88 through a connection portion 84 of the measurement machine body 85, and then, is analyzed there by a computer 89. An analysis result is, on a monitor 90, displayed as an image or a numerical measurement value.

Figure 2:
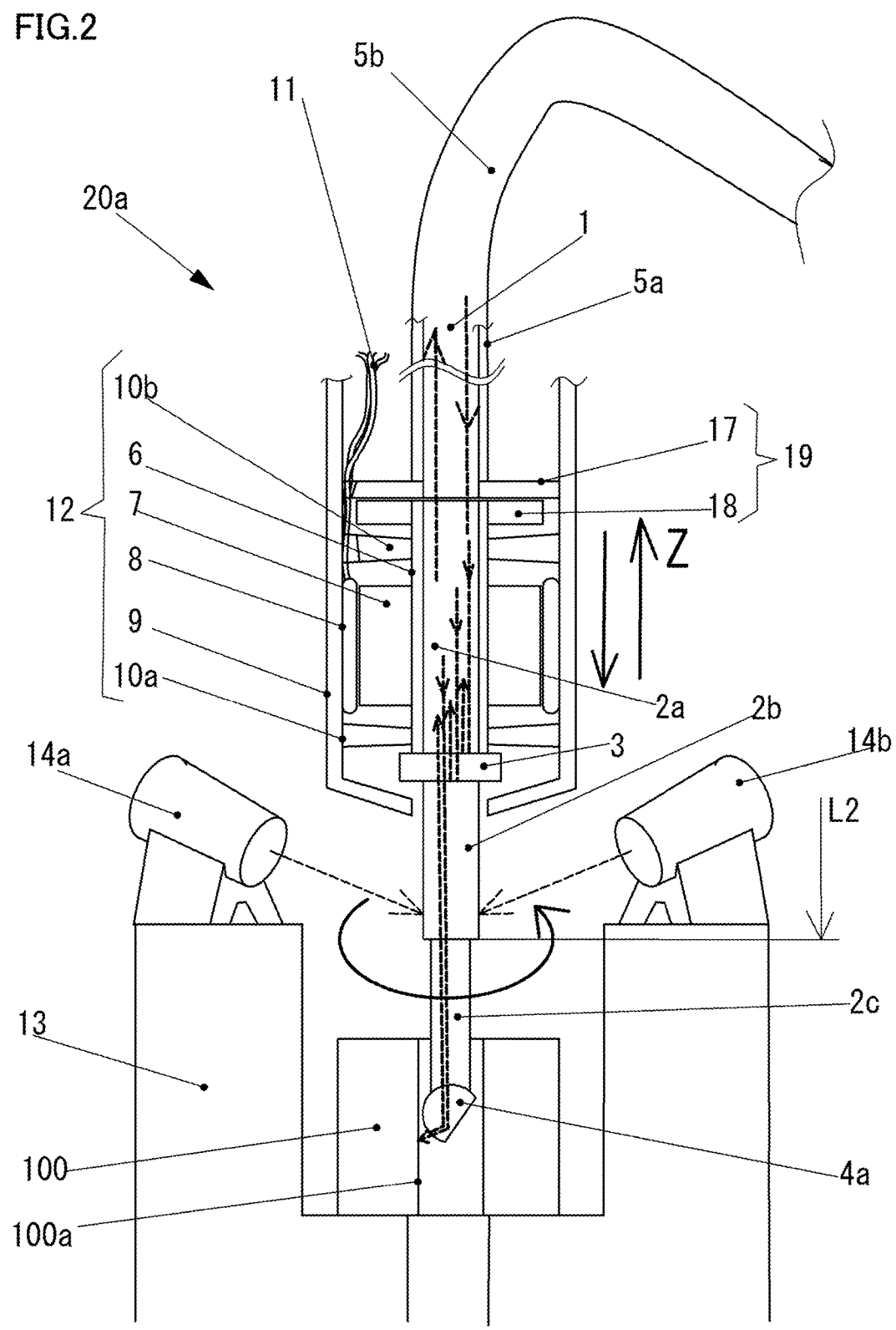
FIG. 2 is a sectional view of an optical probe of the optical inner surface measurement device.

FIG. 2 is a sectional view of a tip end portion of the optical probe 20 of the optical inner surface measurement device according to the present embodiment. A fixed optical fiber 1 configured to guide a light beam from a back end side to a tip end side of the optical probe 20 is inserted into the sufficiently-long tube 5b, and is fixed with an optical fiber fixing tool 17. The rotary optical fiber 2 includes directly or indirectly joined optical fibers 2a, 2b, 2c. The rotary optical fiber 2 (2a, 2b, 2c) is rotatably arranged on a tip end side of the fixed optical fiber 1. On a further tip end side of the rotary optical fiber 2, an optical path conversion device 4a including, e.g., a substantially hemispherical or cylindrical prism is integrally attached. The optical path conversion device 4a is configured to be rotated by a motor 12, thereby emitting a light beam in an entire circumferential direction of 360 degrees.

Smooth end surfaces of the rotary optical fiber 2 and the fixed optical fiber 1 face each other with a minute distance of about 5 microns. These smooth end surfaces, a rotary light blocking plate 18, and the optical fiber fixing tool 17 form a rotary optical joint 19. A high transmittance is maintained between the rotary optical fiber 2 and the fixed optical fiber 1. Thus, both of these components are optically connected with almost no loss.

In the motor 12, a motor coil 8 and bearings 10a, 10b are fixed in the motor case 9. A hollow rotary shaft 6 attached to a motor magnet 7 is rotatably supported by the bearings 10a, 10b. Voltage is applied to the motor coil 8 via an electrical wire 11. The rotary optical fiber 2a is rotatably inserted and fixed into a hole of the rotating hollow rotary shaft 6. A translucent flat plate 3 made of a material, such as quartz, having a refractive index different from that of the optical fiber and exhibiting light transmissivity is fixed between the rotary optical fiber 2a and the optical path conversion device 4a. As necessary, the rotary optical fibers 2b, 2c may be joined to each other such that an optical path is formed. Rotation runout of the rotary optical fiber 2 or the optical path conversion device 4a is detected by the runout detection sensors 14a, 14b. These signals are transmitted to the computer 89.

Power is supplied from a rotary motor driver circuit 86 illustrated in FIG. 1 to the motor 12 of FIG. 2, and accordingly, the motor 12 is rotatably driven. Voltage is applied from a slide motor driver circuit 87 to the slider motor 83, and accordingly, the slider motor 83 is rotatably driven.

Next, main features and advantageous effects of the optical inner surface measurement device of FIG. 1 using the above-described optical probe of FIG. 2 will be described in detail.

As illustrated in FIGS. 1 and 2, a light beam emitted from inside the measurement machine body 85 advances through the fixed optical fiber 1 built in the tube 5b. The motor 12 is rotated by power supplied via the electrical wire 11. Then, the guided light beam passes through the rotary optical joint 19, the rotary optical fiber 2, and the translucent flat plate 3, and is discharged from the optical path conversion device 4a in a substantially perpendicular direction. The light beam is reflected on the measurement target object inner surface 100a. Such reflected light passes through the optical path conversion device 4a, the rotary optical fiber 2, the rotary optical joint 19, and the fixed optical fiber 1 in this order in the opposite direction of the same optical path as that described above, and then, is guided to the optical interference analysis device 88.

Figure 3:
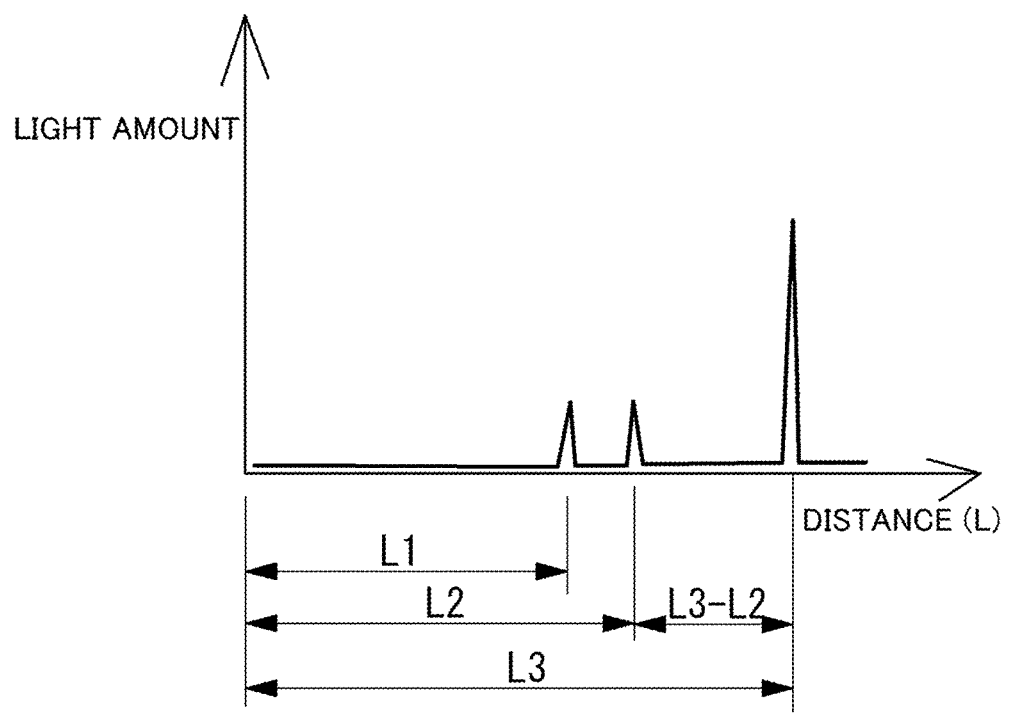
FIG. 3 is a graph for describing an acquired distance waveform of the optical probe.

FIG. 3 illustrates one example of an analysis result of a signal from the optical interference analysis device 88 of the measurement machine body 85 by the computer 89. This result shows a relationship between a distance and signal output (a light amount). In the figure, L1 is an acquired waveform indicating a distance to the translucent flat plate 3 as viewed from the fixed optical fiber 1. In the figure, L2 is an acquired waveform indicating a distance to a tip end side surface of the translucent flat plate 3. L3 is an acquired waveform indicating a distance to the measurement target object inner surface 100a.

Steps of inner diameter measurement of the measurement target object inner surface 100a by means of the optical inner surface measurement device of the present embodiment are as follows.

Figure 4:
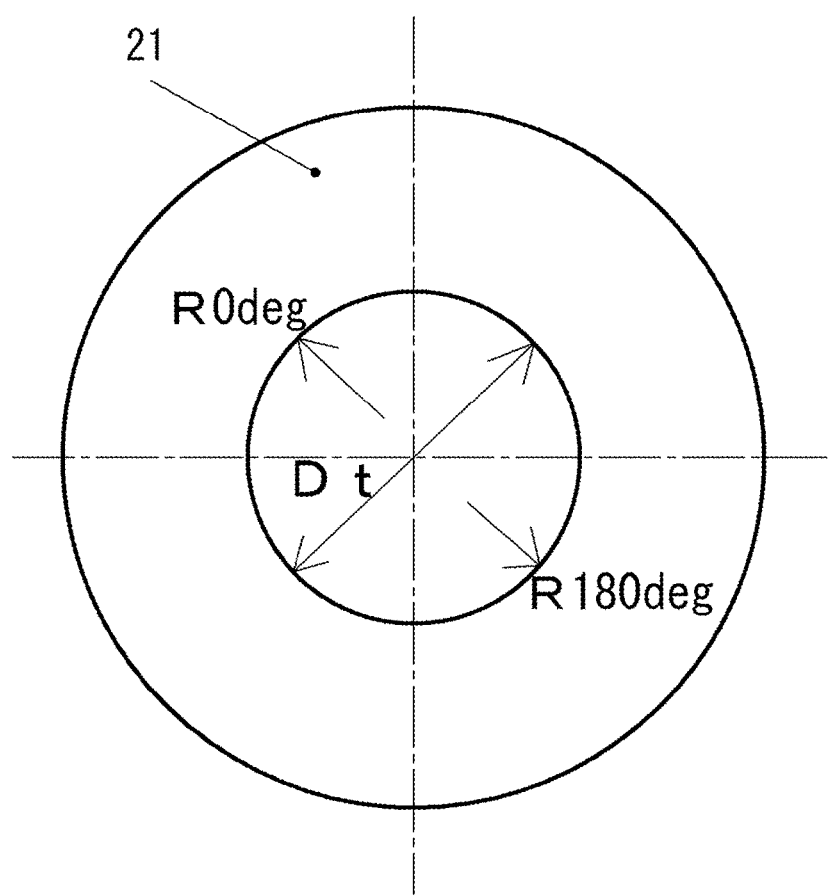
FIG. 4 is a view for describing the method for correcting the optical probe.
Figure 8:
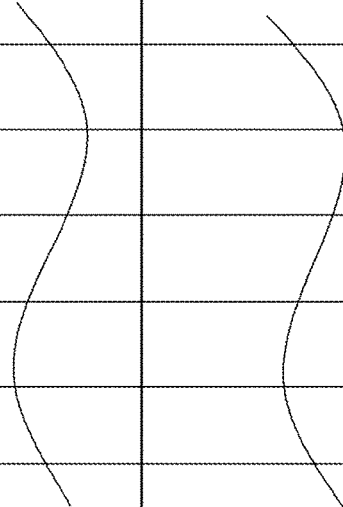
FIG. 8 is a table for describing a correction value of the optical inner surface measurement device for each Z-position.
Figure 9:
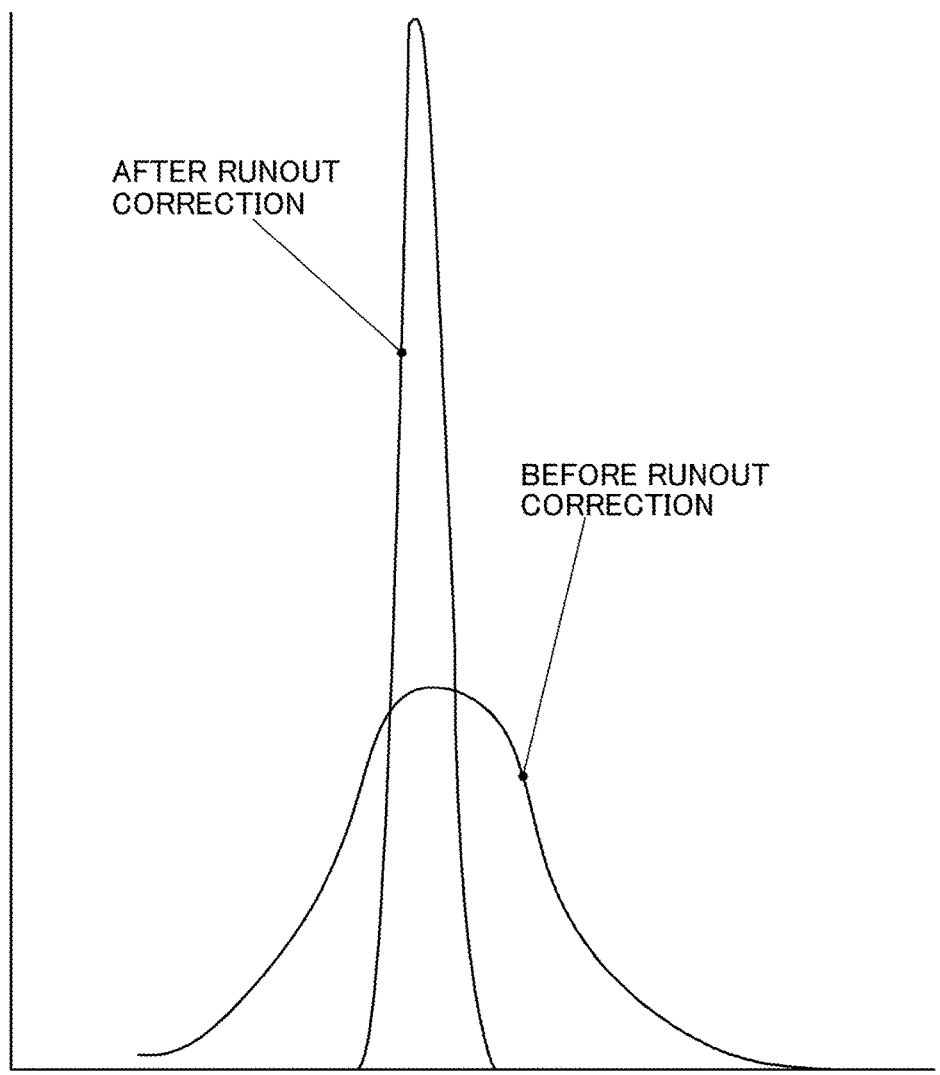
FIG. 9 is a graph for describing measurement variation of the optical inner surface measurement device.

First, correction (calibration) is performed as preparation before measurement. FIG. 4 illustrates a bore gauge 21 used for correction of a measurement value as preparation before use of the optical inner surface measurement device. The optical path conversion device 4a at a tip end of the optical probe 20 enters the inner diameter of the bore gauge 21, and rotatably emits a light beam. A correction value of the optical probe 20 is obtained based on the measured distance (in the figure, R0 deg and R180 deg) to the measurement target object inner surface 100a and the inner diameter dimension Dt of the bore gauge 21. Specifically, the correction value is digital data as shown in FIG. 8. Such correction is regularly performed about once in a month. The method for calculating such a numerical value is as follows.

Description of Signs

| | |
|---|---|
| Bore Gauge 21 Inner Diameter | Dt [mm] |
| XY Runout Sensor 14 Detection Amount | $\Delta rx, \Delta ry$ [mm] |
| Optical Probe Rotation Angle | $\theta$ [mm] |
| Linear Scale 22 Z-direction Position | Z [mm] |
| Measurement Machine Body 85 Detection Distance | R = (L3 − L2) [mm] |
| Optical Probe 20 Detection Distance | L1, L2, L3 [mm] |

Correction (Calibration) Method (Calculation Expressions)

Correction Value: Lc [mm]

At $\theta=0$ deg, $R0$ deg$=(L3-L2)-Lc$

At $\theta=180$ deg, $R180$ deg$=(L3'-L2')-Lc$ $Dt = R0$ deg $- R180$ deg $Dt = (L3_{0\ deg} - L2_{180\ deg}) - (L3_{180\ deg} - L2_{0\ deg}) - 2 \times Lc$ $Lc = Dt - ((L3_{0\ deg} - L2_{180\ deg}) + (L3_{180\ deg} - L2_{0\ deg}))$ Vector Runout Amount $e = \sqrt{(ex^2 + ey^2)}$ The numerical value of the correction value (Lc) within Z=0 to Z [mm] is, as correction data, stored in a computer.

Figure 5:
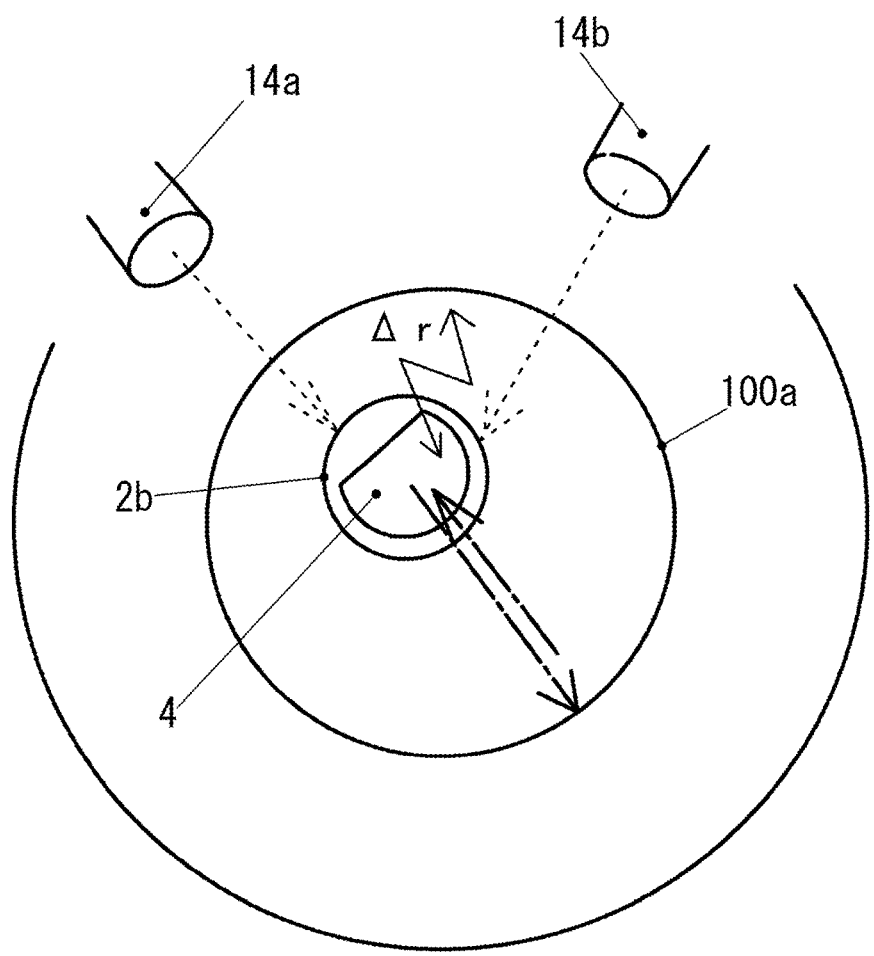
FIG. 5 is a view for describing influence of motor axial runout of the optical probe.

When correction ends, measurement subsequently begins. FIG. 5 illustrates a position relationship between the runout amount of the rotary optical fiber 2 due to axial runout of the motor 12 built in the optical probe 20 and the measurement target object inner surface 100a in the present optical inner surface measurement device. The inserted optical path conversion device 4a of the optical probe 20 is rotated by the motor 12, thereby rotatably emitting a light beam toward the measurement target object inner surface 100a. Then, reflected light of such light is detected. As indicated by the sign Δr, the optical path conversion device 4a and the rotary optical fiber 2 rotates while shaking. Thus, such rotation runout is detected by the runout detection sensors 14a, 14b.

Figure 6:
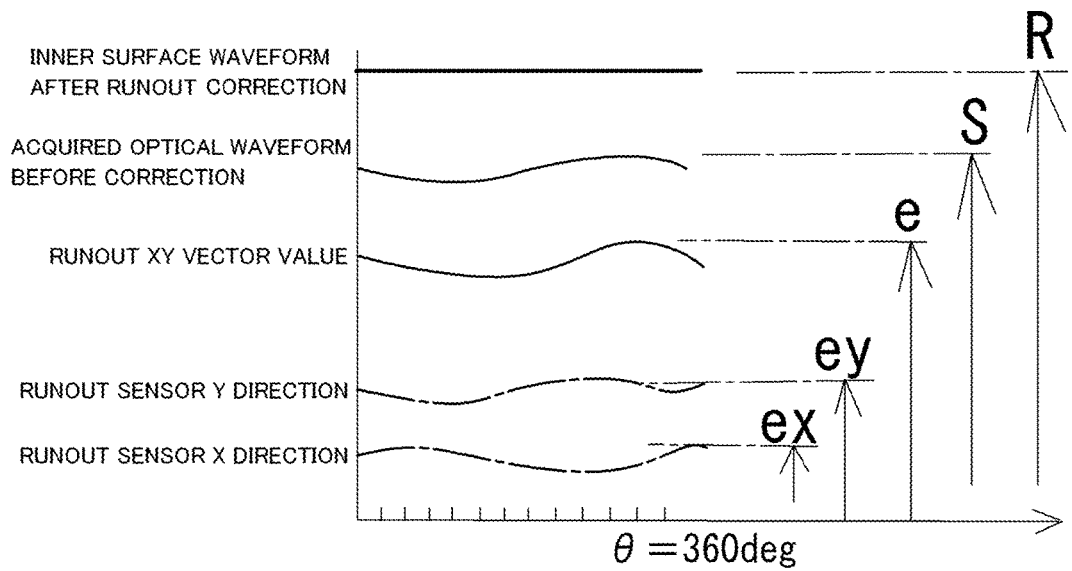
FIG. 6 is a graph for describing a runout amount and a correction method of a rotary optical fiber of the optical probe.

FIG. 6 illustrates a correction calculation method for the rotation runout amount (e) of the tip end portion (the rotary optical fiber 2 or the optical path conversion device 4a) of the optical probe 20 and an obtained radius distance (R). In the figure, ex and ey indicate the outputs of the runout detection sensors 14a, 14b. A sign e indicates a calculated runout vector value. In the figure, S is the distance to the measurement target object inner surface 100a, the distance being obtained by the optical inner surface measurement machine. In the figure, R is a correct dimension value obtained after the measurement distance S has been corrected using data of the runout detection sensors 14a, 14b. The shape of the measurement target object inner surface 100a and the diameters of an inscribed circle Din and a circumscribed circle Dout obtained as described above are illustrated in FIG. 7.

The method for calculating an actual measurement value (R) is as in the following expression.

Actual Measurement Method

The actual measurement value satisfies R=(L3−L2)−e−Lc [mm]

Figure 7:
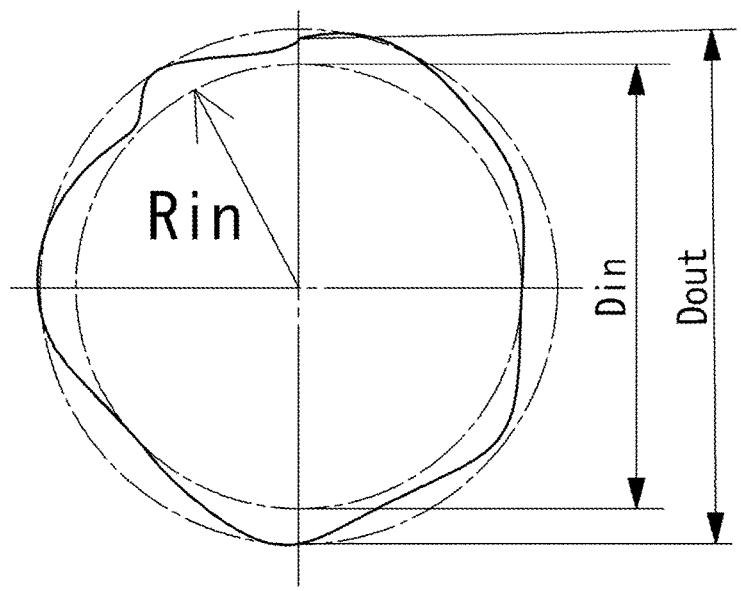
FIG. 7 is a view for describing polar conversion data of the optical inner surface measurement device.

Such data of the radius distance R [mm] is acquired across the entire circumference of 360 degrees, and in this manner, the values of the inscribed circle (Din) and the circumscribed circle (Dout) illustrated in FIG. 7 are obtained. These values are displayed on the monitor 90.

With this configuration, the optical probe 20a can be configured such that the tip end thereof has a thin diameter of 0.1 millimeter order. Thus, a thin-diameter nozzle inner surface can be measured. Moreover, the distance to the measurement target object inner surface 100a is obtained with reference to the translucent flat plate 3, and therefore, a change due to, e.g., the temperature of an optical system or fluctuation of the optical system can be excluded from the measurement value. Moreover, rotation runout of the optical path conversion device 4a can be excluded using the output of the runout detection sensor (actually, the runout amount of the rotary optical fiber 2 is detected to infer rotation runout of the optical path conversion device 4a). Thus, as shown by measurement value variation data of FIG. 9, high-accuracy inner surface measurement with less variation is allowed. Sharp measurement distribution with less variation is obtained as described above because influence of the optical system fluctuation and runout of the rotary optical fiber 2 as described earlier are excluded.

Second Example

Figure 10:
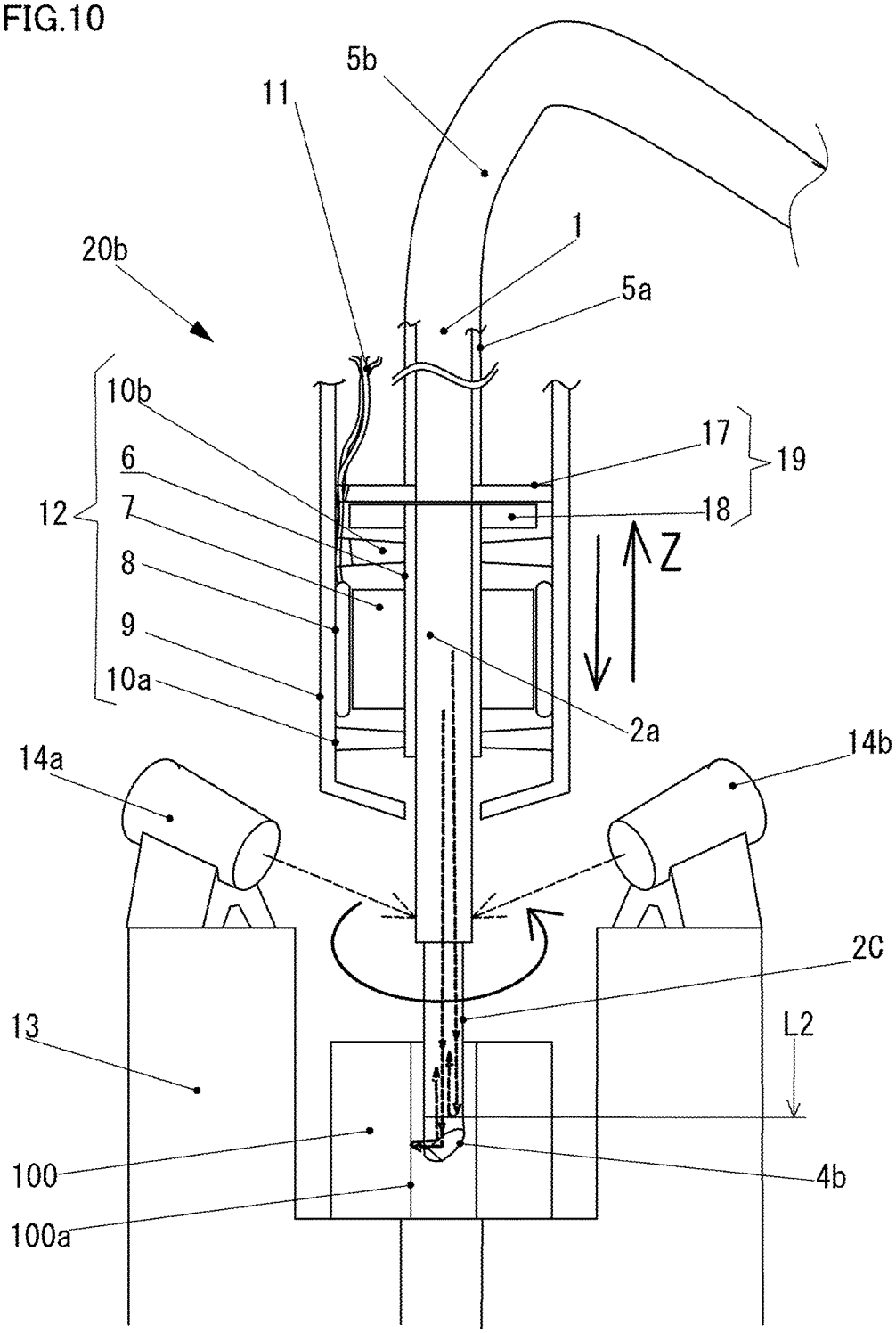
FIG. 10 is a sectional view of an optical probe of a second example of the optical inner surface measurement device.

FIG. 10 illustrates an optical probe 20b used for an optical inner surface measurement device of the present example.

In FIG. 10, an optical path conversion device 4b including, e.g., a prism obtained by processing of quartz having a refractive index different form that of a rotary optical fiber 2 and exhibiting light transmissivity is joined to tip ends of rotary optical fibers 2a, 2c rotated by a motor 12. Thus, some of light beams having advanced in the rotary optical fiber 2a, 2c are reflected on a joint surface between the optical path conversion device 4b and the rotary optical fiber 2c, and then, return to a measurement machine body 85 side. A measurement target object inner surface 100a is irradiated in a substantially perpendicular direction with most of the remaining light beams. Reflected light of such light similarly returns to the measurement machine body 85 side.

In FIG. 10, other configurations, functions, and operations are the same as those of the optical probe of FIG. 2. Note that in FIGS. 1, 2, and 10, the optical path conversion device 4a, 4b is, together with the slider 82 and the rotary optical fiber 2c, moved up and down in the direction of an arrow Z in the figure by the slider motor 83. By measurement of the measurement target object inner surface 100a at multiple points thereof, a diameter, a roundness, a cylindricity, and the inclination angle of the slider 82 with respect to the measurement target object inner surface 100a are calculated. The calculated values can be displayed on the monitor 90.

In FIGS. 2 and 10, the diameter of the rotary optical fiber 2 at the tip end portion is about 80 micrometers. Of the rotary optical fiber 2a, a portion inserted into the hollow rotary shaft 6 of the motor 12 has a diameter of about 125 micrometers.

The hollow rotary shaft 6 illustrated in FIGS. 2 and 10 is made of a metal or ceramic material. The hollow rotary shaft 6 is formed in a hollow shape by the process of drawing molten metal by a die or the process of extruding pre-calcined ceramics by a die. Thereafter, a finish process by, e.g., a polishing method is performed through hardening processing.

According to the present embodiment, measurement, which has been typically unavailable, of a thin-hole inner surface having a diameter of 0.1 millimeter order can be accurately and precisely performed by eliminating influence of fluctuation of the optical system and influence of motor axial runout in the optical inner surface measurement device configured to observe and measure the measurement target object.

According to the optical inner surface measurement device of the present embodiment, inner surface measurement for a thin hole having a diameter of 0.1 millimeter order is performed. Thus, dimension measurement and geometric accuracy measurement are available for, e.g., a thin hole of an automobile fuel injection nozzle or an inkjet nozzle. Thus, it is expected that the optical inner surface measurement device of the present embodiment is applied to an industrial measurement device configured to measure a minute shape.

The optical inner surface measurement device of the present disclosure may be the following first to third optical inner surface measurement devices.

The first optical inner surface measurement device is an optical inner surface measurement device configured to observe and measure a measurement target object, the optical inner surface measurement device including a rotation-side optical fiber to be rotated by a motor and a stationary-side optical fiber not to be rotated relative to the rotation-side optical fiber. An optical path conversion section is provided at a tip end of the rotation-side optical fiber. At the back of the motor, both end surfaces of the rotation-side optical fiber and the stationary-side optical fiber face each other with a minute clearance to form a rotary optical joint. A runout detection sensor configured to measure a runout amount of the rotation-side optical fiber is provided. Reflected light, which is captured by the optical path conversion section, from a measurement target object inner surface is guided to a measurement machine body by way of the rotation-side optical fiber and the stationary-side optical fiber and is analyzed by a computer to obtain inner surface measurement data, and the inner surface measurement data is corrected based on the runout amount detected by the runout detection sensor.

The second optical inner surface measurement device is the first optical inner surface measurement device in which a translucent flat plate made of a material having a refractive index different from that of the rotation-side optical fiber is integrally provided at at least part of the rotation-side optical fiber on a back side with respect to the optical path conversion section and the length of a light beam from the translucent flat plate to a measurement target object surface is measured.

The third optical inner surface measurement device is the first or second optical inner surface measurement device in which the optical path conversion section includes a prism made of a translucent material having a refractive index different from that of the rotation-side optical fiber and the length of a light beam from the tip end of the rotation-side optical fiber to the measurement target object surface is measured.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical inner surface measurement device comprising:
    a motor;
    a rotary optical fiber configured to be rotated by the motor;
    a fixed optical fiber configured not to rotate relative to the rotary optical fiber; and
    a runout detection sensor configured to measure a runout amount of the rotary optical fiber, wherein
    an optical path conversion device is arranged at a tip end of the rotary optical fiber,
    at a back of the motor, both end surfaces of the rotary optical fiber and the fixed optical fiber face each other with a minute clearance,
    a measurement machine body emits light to an inner surface of a measurement target object and reflected light, which is reflected from the inner surface of the measurement target object and captured by the optical path conversion device, is guided to the measurement machine body by way of the rotary optical fiber and the fixed optical fiber and is analyzed by a computer to produce inner surface measurement data, the inner surface measurement data being corrected based on the runout amount detected by the runout detection sensor,
    a translucent flat plate made of a material having a refractive index different from that of the rotary optical fiber is integrally provided at at least part of the rotary optical fiber on a back side with respect to the optical path conversion device, and
    a length of a light beam from the translucent flat plate to a measurement target object surface is measured.

2. The optical inner surface measurement device according to claim 1, wherein
    the optical path conversion device comprises a prism made of a translucent material having a refractive index different from that of the rotary optical fiber, and
    a length of a light beam from the tip end of the rotary optical fiber to a measurement target object surface is measured.

* * * * *